July 25, 1950  G. C. ARMSTRONG  2,516,538
PROTECTIVE CONTROL SYSTEM
Filed May 5, 1948
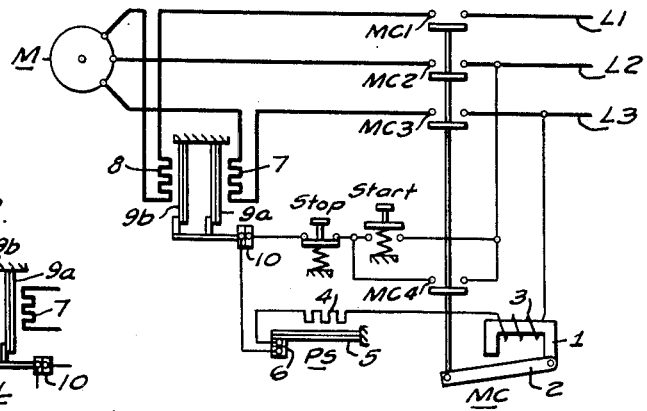
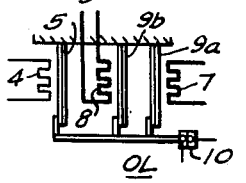
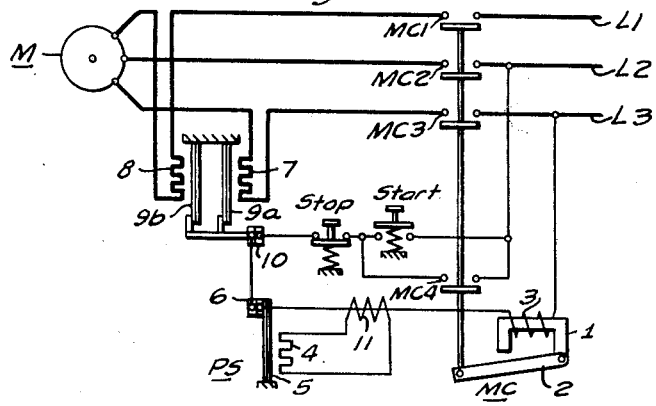
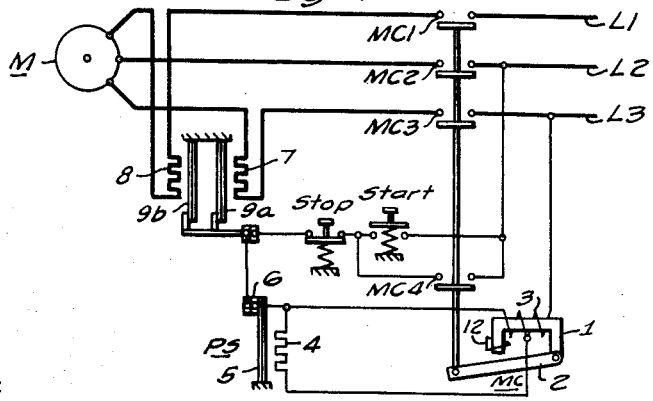
WITNESSES:
INVENTOR
George C. Armstrong.
BY
Paul E. Friedemann
ATTORNEY Patented July 25, 1950

2,516,538

UNITED STATES PATENT OFFICE 2,516,538

PROTECTIVE CONTROL SYSTEM

George C. Armstrong, Pittsburgh, Pa., assignor to Westinghouse Electric Corporation, East Pittsburgh, Pa., a corporation of Pennsylvania Application May 5, 1948, Serial No. 25,250

10 Claims. (Cl. 175—294)

This invention relates generally to electrical control systems and more in particular to electrical systems for protecting electrical load devices, such as motors against abnormal operating conditions.

The invention, by way of illustration but not in limitation, is shown in the drawing as a protective system for alternating-current motors. Alternating-current motors designed for intermittent duty may be protected against operation at loads above rating by means of overload relays. However, because the time constant of a motor is long relative to the time constant of standard overload relays, such relays will not afford protection against normal loads sustained for a time beyond the rated motor time. Often such motors, because of high iron losses, cannot operate safely for a time much beyond rating even at light loads. The motors are particularly sensitive to high line voltage.

A broad object of this invention is to provide an electrical system of control for an electrical load device which affords adequate protection against predetermined abnormal operating conditions.

Another object of this invention is to provide a system of control for a motor in which a selected electrical condition is utilized to quickly produce an electrical quantity of sufficient magnitude to disconnect the motor from its source of electrical energy.

More specifically, it is an object of this invention to provide a protective system for alternating-current motors in which means are provided for disconnecting the motor from the supply of alternating current in the event of occurrence of excessive line voltage.

A further specific object of this invention is to provide a protective system for alternating-current motors in which current-regulating means responsive to an electrical quantity of the motor supply circuit is utilized in conjunction with a thermally responsive switch to disconnect the motor from its alternating-current supply.

In a general sense, an object of this invention is to provide a protective circuit responsive to an electrical quantity in which currents are produced of a predetermined magnitude for control purposes in accordance with predetermined magnitudes of said electrical quantity.

The foregoing statements are merely illustrative of the various aims and objects of this invention. Other objects and advantages will become apparent upon a study of the following disclosure when considered in conjunction with the accompanying drawing in which:

Figure 1 illustrates a protective system for an alternating-current motor embodying the principles of this invention, Fig. 2 illustrates a combination of the overload and protective switches of Figure 1 to form a single unit, Fig. 3 shows a detailed variation of the protective system illustrated in Figure 1, and Fig. 4 illustrates a further variation of this invention.

The three-phase alternating-current motor M in Figure 1 is connected to a suitable supply of alternating current designated by conductors L1, L2 and L3 by means of the contacts MC1, MC2 and MC3 of the main contactor MC, which contacts are respectively connected in the supply lines L1, L2 and L3. The main contactor MC is actuated by a magnet having a core 1, a movable armature 2 and a coil 3. The coil 3 is connected in series in a control circuit connected across the conductors L2 and L3 having also in series therein the contact 6 of the protective switch PS, the contacts 10 of the overload switch OL and the Stop and Start push buttons which are so designated in the drawing. The Start push button is shunted by the holding contacts MC4 of the main contactor.

Both the protective switch and the overload switch are thermally operated. To this end, the overload switch is provided with a pair of heaters 7 and 8 which are connected in the usual manner in series in the supply lines L1 and L3 to be energized in dependence of the line currents. The heaters 7 and 8 are each disposed adjacent bimetallic members 9a and 9b, respectively, which separately or together actuate the movable element of switch 10. Thus, if the motor is operating above rating, the line currents circulating in the heaters 7 and 8 cause the bimetals 9a and 9b to deflect and open the switch 10. In the event of open phase, one bimetal opens the switch 10. As previously noted, however, the overload switch will not afford protection against normal loads which are sustained for a time beyond the rated motor time. The protective switch PS is similarly constructed and includes a heater 4 which is connected in series in the control circuit and a bimetallic element 5 which actuates the movable element of the switch 6.

The means for protecting the motor against normal loads sustained for a time beyond the normal rated time is embodied in the combination of the magnet which actuates the main contactor and the protective switch PS. In accomplishing this, the voltage appearing across the lines L2 and L3 is utilized to indicate an abnormal operating condition of the motor. This voltage, if above a predetermined magnitude, produces a current in the control circuit which is sufficiently high to cause actuation of the protective switch PS so that the contacts 6 are opened. Opening of the contact 6 deenergizes the control circuit and as a consequence, the coil 3 of the magnet is deenergized causing the main contactor to drop out and open its contacts MC1, MC2 and MC3, disconnecting the motor from its supply.

The means for producing this control current is embodied in the construction of the magnet which operates the main contactor. The core 1 of this magnet may be formed of nickel-iron laminations or other Curie alloys. These alloys have the property of decreasing in permeability at a predetermined temperature thereof. Thus, for example, if the laminations of the core 1 have a Curie point of the order of 100° C., the ampere turns of the coil 3, at normal line voltage, will be such as to produce heating of the core 1 approaching the 100° C. limit. In the temperature range, up to 100°, the impedance characteristics of the magnet will follow the usual pattern, that is, increasing currents will produce greater fluxes and the impedance of the magnet will increase. However, should the line voltage exceed that for which the motor is rated, the increasing losses due to the increasing currents in the coil 3 will carry the core temperature above the assumed 100° C. limit. At this point, the permeability of the magnet decreases and in an effort to maintain the flux, the current through the coil increases. By suitably proportioning the constants in the system, a current can be caused to flow through the control circuit of sufficient magnitude to cause the bimetal 5 to open the switch 6, at which time the magnet of the main contactor is deenergized and the motor is disconnected from the line.

The design is so coordinated that at normal voltage the protective switch PS will trip and open the magnet coil circuit within specified time limits. For this purpose, the coil is preferably energized from the same power source as the motor. If the line voltage is above normal, the motor will heat more rapidly but the current of coil 3 and the rate of heating of the core 1 will be correspondingly increased so that the trip time of the protective switch PS will be decreased affording the necessary increased motor protection.

If the motor is intermittently operated in a short time cycle, the motor will be more rapidly heated. However, under this condition, the coil 3 will more rapidly heat the core 1 because of the high closing current of the magnet and as a consequence, the heat 4 of the protective switch will be heated more rapidly so that increased protection will be afforded.

As an alternative, the switch PS could be combined with the overload relay, as shown in Fig. 2, in which case the bimetal 5 under the influence of heater 4, yet heated from the control circuit current, opens the switch 10 and switch 6 is dispensed with.

The embodiment of Fig. 3 minimizes the difficulty of designing a protective switch PS which is exactly right for the conditions under which it is to be used. This is accomplished by utilizing a current transformer 11 which is connected in series in the control circuit. The output of the transformer 11 may be made any suitable value to adjust the time constant of the protective switch PS to suit the time constant of the motor which is to be protected, otherwise Fig. 2 is the same as Figure 1 and like parts bear like reference characters, so that the operation thereof will be readily understood in view of the description concerning Figure 1.

Similar effects are achieved in Fig. 4 by connecting the heater 4 of the protective switch PS across a portion of the coil 3 of the magnet for the main contactor. By properly selecting the voltage which is tapped from the coil 3, the time constant of the protective switch may be adjusted to suit the operating conditions. In each case, it will be noted, the heater 4 is responsive to the current of the control circuit. Here again parts corresponding to those of Figure 1 bear like reference characters.

In operation the magnet core 1 is heated by coil and iron losses. The total losses may be increased, as required, to give any desired heating-time characteristic by including in the magnet design suitable conductive material inductively linking the magnetic circuit. In Fig. 3 this is embodied as a short-circuited coil 12 disposed about a portion of the magnet core. The number of turns of this coil will be determined by the extent of the losses which are desired.

In order to obtain the long time characteristic of a typical motor, the main contactor, overload switch, and protective switch are all enclosed in a cabinet so that the temperature rise of the air within the cabinet is superimposed upon the heating of the magnet. The usual cabinet temperature rises are 15° to 30° C. above ambient temperature. This temperature elevation becomes a very considerable part of the total rise of bimetal temperatures.

The foregoing disclosure and the showing made in the drawing are merely illustrative of the principles of this invention and are to be interpreted in a limiting sense.

I claim as my invention:

1. In a protective system for an alternating-current motor, the combination of, contact means for connecting said motor to a supply of alternating current, an electromagnet having a coil, a core and a movable armature for operating said contact means, said core being of a material which decreases in permeability substantially inversely with temperature above a predetermined temperature, a control circuit for connecting said coil to said supply of alternating current, said coil having sufficient ampere turns at a given current to heat said core to said predetermined temperature, a thermal switch having contacts connected in series in said control circuit and energized in dependence of the current in said control circuit, and a second thermal switch having contacts connected in series in said control circuit and energized in dependence of the load current of said motor.

2. In a protective system for an alternating-current motor, the combination of, contact means for connecting said motor to a supply of alternating current, an electromagnet having a coil, a core and a movable armature for operating said contact means, said core being of a material which decreases in permeability substantially inversely with temperature above a predetermined temperature, a control circuit for connecting said coil to said supply of alternating current, said coil having sufficient ampere turns at a given current to heat said core to said predetermined temperature, a thermal switch having contacts and a heater, said contacts being connected in series in said control circuit and said heater being connected in series in said control circuit, and a second thermal switch having contacts and a pair of heaters, each heater of said pair of heaters being connected in series in a supply line of said motor and said last-named contacts being connected in series in said control circuit.

3. In a protective system for an alternating-current motor, the combination of, contact means for connecting said motor to a supply of alternating current, an electromagnet having a coil, a core and a movable armature for operating said contact means, said core being of a material which decreases in permeability substantially inversely with temperature above a predetermined temperature, a control circuit for connecting said coil to said supply of alternating current, said coil having sufficient ampere turns at a given current to heat said core to said predetermined temperature, a current transformer connected in series in said control circuit, a thermal switch having contacts and a heater, said contacts being connected in series in said control circuit, and said heater being connected to said current transformer to be energized by the output thereof, and a second thermal switch having contacts and a pair of heaters, each heater of said pair of heaters being connected in series in a supply line of said motor and said last-named contacts being connected in series in said control circuit.

4. In a protective system for an alternating-current motor, the combination of, contact means for connecting said motor to a supply of alternating current, an electromagnet having a coil, a core and a movable armature for operating said contact means, said core being of a material which decreases in permeability substantially inversely with temperature above a predetermined temperature, a control circuit for connecting said coil to said supply of alternating current, said coil having sufficient ampere turns at a given current to heat said core to said predetermined temperature, a thermal switch having contacts and a heater, said contacts being connected in series in said control circuit, circuit means connecting said heater across at least a portion of said coil of said electromagnet, and a second thermal switch having contacts and a pair of heaters, each heater of said pair of heaters being connected in series in a supply line of said motor and said last-named contacts being connected in series in said control circuit.

5. In an electrical control circuit, the combination of, an electromagnet having a coil and a core, said core being of a material which decreases in permeability above a given temperature, circuit means connecting said coil to a supply of electrical energy, said coil having sufficient ampere turns to heat said core to said given temperature upon the occurrence of a predetermined current in said circuit, electrical heating means connected in series in said circuit, and switching means responsive to said electrical heating means connected in series in said circuit.

6. In an electrical control circuit, the combination of, an electromagnet having a coil and a core, said core being of a material which decreases in permeability above a given temperature, circuit means connecting said coil to a supply of alternating current, said coil having sufficient ampere turns to heat said core to said given temperature upon the occurrence of a predetermined current in said circuit, a current transformer connected to respond to the current in said circuit, and electrical means responsive to the output of said current transformer for controlling said circuit.

7. In an electrical control circuit, the combination of, an electromagnet having a coil and a core, said core being of a material which decreases in permeability above a given temperature, circuit means connecting said coil to a supply of alternating current, said coil having sufficient ampere turns to heat said core to said given temperature upon the occurrence of a given current in said circuit, electrical means connected across at least a tapped portion of said coil, and control means responsive to said electrical means for controlling said circuit.

8. Apparatus as set forth in claim 7 in which said electrical means comprises a resistor and said control means comprises a bimetal switch connected in series in said circuit.

9. In a system for controlling the supply of electrical energy to a load, the combination of, an electromagnet having a core of a material which decreases in permeability above a predetermined temperature, a control circuit connecting said electromagnet to said supply of electrical energy, electrical control means responsive to the current in said control circuit for interrupting said control circuit, and circuit means connected in said control circuit for controlling the supply of electrical energy to said load.

10. In combination, a load circuit, a switch for connecting the load circuit with a supply of alternating current, an electromagnet having a coil, a core and a movable armature for actuating said switch, said core being of a material which decreases in permeability substantially inversely with temperature above a predetermined temperature, a control circuit for connecting said coil to said source of alternating current, said coil having sufficient ampere turns at a predetermined current to heat said core to said predetermined temperature, and a thermally operated switch having a heater connected to the control circuit to be energized in dependence of the current flowing therein and a pair of contacts connected in series in said control circuit.

GEORGE C. ARMSTRONG.

REFERENCES CITED

The following references are of record in the file of this patent:

UNITED STATES PATENTS

| Number | Name | Date |
|---|---|---|
| 1,312,454 | Raney | Aug. 5, 1919 |
| 1,561,386 | White | Nov. 10, 1925 |
| 1,716,164 | Claytor et al. | June 4, 1929 |
| 1,761,764 | Witherow | June 3, 1930 |
| 1,764,375 | White | June 17, 1930 |
| 2,255,638 | Armstrong | Sept. 9, 1941 |
| 2,296,969 | Wittamann | Sept. 29, 1942 |
| 2,322,069 | Stimson | June 15, 1943 |
| 2,324,525 | Mittlemann | July 20, 1943 |
| 2,339,125 | Winter | Jan. 11, 1944 |
| 2,429,819 | Jordan | Oct. 28, 1947 |

FOREIGN PATENTS

| Number | Country | Date |
|---|---|---|
| 292,922 | Great Britain | Feb. 21, 1929 |